(12) United States Patent
Selitser et al.

(10) Patent No.: US 8,719,780 B2
(45) Date of Patent: May 6, 2014

(54) APPLICATION SERVER WITH A PROTOCOL-NEUTRAL PROGRAMMING MODEL FOR DEVELOPING TELECOMMUNICATIONS-BASED APPLICATIONS

(75) Inventors: Boris Selitser, Castro Valley, CA (US); Sharath Rajasekar, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 24 days.

(21) Appl. No.: 13/171,088

(22) Filed: Jun. 28, 2011

(65) Prior Publication Data

US 2011/0321011 A1 Dec. 29, 2011

Related U.S. Application Data

(60) Provisional application No. 61/359,670, filed on Jun. 29, 2010.

(51) Int. Cl.
*G06F 9/44* (2006.01)

(52) U.S. Cl.
USPC ............ 717/120; 717/106; 717/108; 717/116

(58) Field of Classification Search
None
See application file for complete search history.

(56) References Cited

U.S. PATENT DOCUMENTS

| | | | |
|---|---|---|---|
| 6,704,805 B1 * | 3/2004 | Acker et al. ................... | 719/315 |
| 6,963,583 B1 * | 11/2005 | Foti ............................... | 370/467 |
| 7,593,980 B2 * | 9/2009 | Marascio et al. ............. | 709/201 |
| 7,757,242 B2 * | 7/2010 | Khan et al. ..................... | 719/330 |
| 7,917,651 B2 * | 3/2011 | Khan et al. ..................... | 709/246 |
| 7,933,291 B2 * | 4/2011 | Wormer et al. ................ | 370/466 |
| 2008/0144604 A1 * | 6/2008 | Sharma et al. ................ | 370/352 |
| 2010/0046436 A1 * | 2/2010 | Doviak et al. ................. | 370/328 |
| 2011/0321011 A1 * | 12/2011 | Selitser et al. ................ | 717/120 |
| 2012/0005262 A1 * | 1/2012 | McWhirter et al. .......... | 709/203 |
| 2012/0069131 A1 * | 3/2012 | Abelow ....................... | 348/14.01 |
| 2012/0173715 A1 * | 7/2012 | Selitser et al. ................ | 709/224 |

FOREIGN PATENT DOCUMENTS

| | | | | |
|---|---|---|---|---|
| EP | 1580956 | * | 9/2005 | ............. H04L 29/06 |
| EP | 1580956 A2 | * | 9/2005 | |

* cited by examiner

*Primary Examiner* — Isaac Tecklu
*Assistant Examiner* — Hossain Morshed
(74) *Attorney, Agent, or Firm* — Meyer IP Law Group (57) ABSTRACT

An application server is described for development of telecommunications-based software applications. The application server provides a protocol-neutral programming model for application developers. Rather than having to account for specific protocol entry points into the server, all interactions in the server are abstracted as asynchronous events through the event broker layer. State management and concurrency are implemented as an actor-based model, where each actor owns its own segment of state and other actors wishing to update that state send asynchronous events to the owner. Thus, any communication in the various protocols can be expressed as an asynchronous event passed to, from and between the actors, who are each responsible for maintaining their own segment of state locally. This architecture allows multiple protocols to be consumed in one process, allow applications sessions to span multiple environments and protocols, and allows the programming model to be decoupled from any particular protocol entry point.

20 Claims, 4 Drawing Sheets

APPLICATION SERVER WITH A PROTOCOL-NEUTRAL PROGRAMMING MODEL FOR DEVELOPING TELECOMMUNICATIONS-BASED APPLICATIONS

CLAIM OF PRIORITY

The present application claims the benefit of U.S. Provisional Patent Application No. 61/359,670, entitled "APPLICATION SERVER WITH A PROTOCOL-NEUTRAL PROGRAMMING MODEL FOR DEVELOPING TELECOMMUNICATIONS-BASED APPLICATIONS," by Boris Selitser et al., filed on Jun. 29, 2010, which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to software application servers and more particularly to development and execution of applications that include telecommunications-based functionality.

BACKGROUND

In today's world of telecommunications, more and more devices and functionalities are being integrated with one another in order to create new features and capabilities for the everyday user, as well as for large organizations and enterprises. Numerous examples of this can be seen in the realms of mobile devices, cellular phones and computers. Everything from electronic mail, internet access, text messaging, video and digital photography to video games, social networking and other forms entertainment, are becoming available for a wide variety of mobile devices. Countless web applications now provide services that can access or be accessed via mobile phone to enable a particular feature.

Given all of this pervasiveness, the development and management of software applications must expand in order to accommodate a multitude of mediums and modes of operation previously unconsidered by most developers. As a simple illustration, in order to allow an internet user of a web application to set up a conference telephone call between several end subscribers, the application must be able to interact in some meaningful way with multiple and substantially different protocols and networks.

Traditionally, web applications have been built using the structures, threading models and state management techniques derived from the hypertext transfer protocol (HTTP) Servlet specification. The fundamentals of such applications have thus been limited and restricted in many ways by the model of interaction of HTTP. As such, when a web application needs to use HTTP and some other protocol that has a different interaction pattern, the two models are often in conflict. The resulting applications are thus left unsupported by either model, or end up with difficult and un-maintainable workarounds.

What is needed is a more generic and abstract approach to constructing new applications, one that is not limited by any particular protocol and one that does not contain preferences to any single mode of interaction. It is desirable that this new approach address a model for reuse of application components, as well as provide simplified fault tolerance, concurrency, atomicity and transparent distribution for various applications. Applicant has identified these, as well as other shortcomings and needs that currently exist in the art in coming to conceive the subject matter of the present disclosure.

SUMMARY OF INVENTION

In the present disclosure, systems and methods are described that provide an application server for the development of telecommunications-based software applications. This new application server employs a protocol-neutral programming model for application developers. Rather than having to account for specific protocol entry points into the server, all interactions in the server are abstracted as asynchronous events through the event broker layer. State management and concurrency are implemented as an actor-based model, where each actor owns its own segment of state and other actors wishing to update that state send asynchronous events to the owner. Thus, any communication in the various protocols can be expressed as an asynchronous event passed to, from and between the actors, who are each responsible for maintaining their own segment of state locally. This architecture allows multiple protocols to be consumed in one process, allow applications sessions to span multiple environments and protocols, and allows the programming model to be effectively decoupled from any particular protocol entry point.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

The embodiments of the present invention encompass a new application server that is specifically designed for development and execution of software applications that include telecommunications-based functionality. In particular, the application server provides a programming model that is focused on protocol abstraction and protocol neutrality. This programming model is composed of two layers, namely a basic toolkit layer and a communicating sequential processes (CSP) adaptation layer.

The basic toolkit is a grouping of primitives needed to implement the applications on the application server. In order to achieve protocol abstraction, the basic toolkit employs an event-based model of communications. In this model, a set of protocol adapters is used in conjunction with an event broker. The event broker maps all protocol-specific communications exposed by the adapters into a set of asynchronous events. The various application components executing on the application server can then consume protocol-inbound asynchronous events from the protocol adapters and produce protocol-outbound asynchronous events to the protocol adapters via the event broker. In this manner, the programming model decouples all application component communications from the specific semantics of each protocol.

CSP Adaptation is a higher level abstraction layered on top of the basic toolkit. The CSP adaptation represents simplifications and adaptations of the original basic model, while keeping the main principles in tact. More specifically, the CSP Adaptation layer utilizes an actor-based model, where each actor can group together one or more application components. In various embodiments, actors are special classes that are involved in message passing between each other. In one embodiment, each actor is the owner of its own segment of state, which is only accessible to that actor. Other actors interested in updating that state would send asynchronous events to the owning actor, with the implicit intention that the owning actor will react to those events. In one embodiment, each actor is single-threaded in its operation with respect to the events that it processes and is collocated on the same node (e.g. physical machine) as the state that it owns. Due to these characteristics, actors do not need to issue explicit global locks on the state that they access, since they are the sole owners of that state.

In the various embodiments, the CSP adaptation is the ideal target layer in which most applications will be implemented, while the basic toolkit is the model for the remaining few highly specific cases. Since the basic toolkit model is defined as a lower layer of primitives, it can be viewed as implementing the CSP adaptation. In one embodiment, the CSP adaptation is based on the CSP mathematical model described in more detail in Hoare, C.A.R. *Communicating Sequential Processes*, Prentice Hall, (1985), which is incorporated herein in its entirety.

The application server, including the two layers of its programming model, are described in further detail below, along with the illustrated figures.

Figure 1:
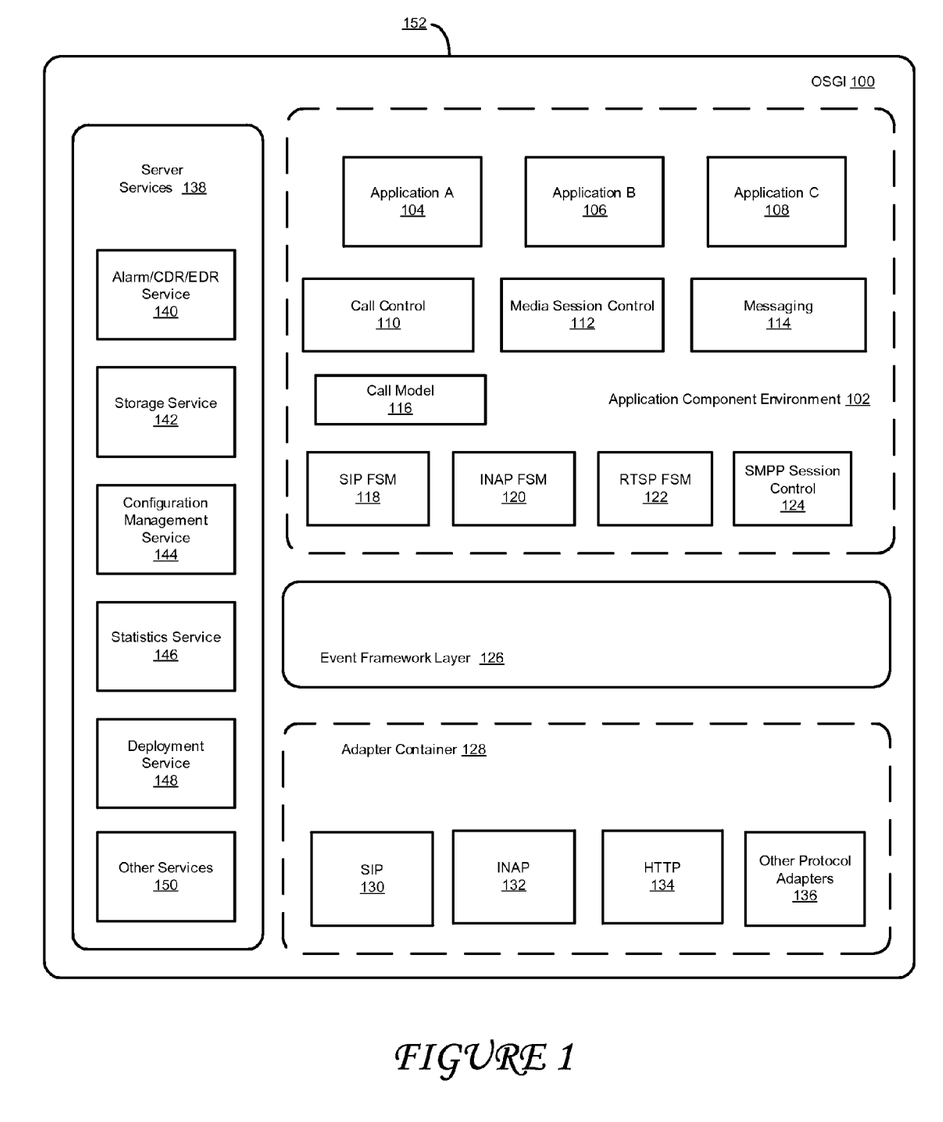
FIG. 1 is a functional illustration of the application server, in accordance with various embodiments of the invention.

FIG. 1 is a functional illustration of the application server, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the application server 152 includes an OSGI kernel 100, an event framework layer 126 and a selection of server services 138. The OSGI kernel 100 provides lifecycle management, class loading, dependency resolution and deployment features for the application components on the server. In one embodiment, the application components 104, 106, 108 can be basic OSGI bundles deployed on the server.

The event framework layer 126 provides an event-based communication model between the application component environment 102 and the adapter container 128. More specifically, the framework layer provides an event broker that maps all protocol-specific communications exposed by the various protocol adapters 130, 132, 134, 136 into asynchronous events, which can be consumed by the application components 104, 106, 108. Additionally, the application components can produce asynchronous events for propagation to the protocol adapters via the event broker. The event-based programming model will be described in more detail with reference to FIG. 2, below.

The protocol adapters 130, 132, 134, 136 serve the function of bringing in the ability to support multiple protocols by the application server 152. Each of the various protocols, such as session initiation protocol (SIP) 130, intelligent network application part (INAP) of the SS7 protocol 132, hypertext transfer protocol (HTTP) 134 and many others 136, would have their own adapter. These protocol adapters can interface with the adapter container 128, the event framework 126 and the server services 138. The adapter container can expose a service provider interface for building new protocol adapters as new protocols emerge or become more widely used. The event framework layer is used to communicate with application components 104, 106, 108. With respect to the event model, the protocol adapters are consumers and producers of asynchronous events. The SPI interfaces implemented by protocol adapters reflect the complexity relative to application components. Primarily, adapters implement efficient input and output operations (I/O) towards a specific protocol. In addition, protocol-specific security, error handling, and abstraction can all be encapsulated in adapters. The adapter container 128 is designed to support a contract in which it cooperates with the adapters to provide connectivity to the network by the application components 104, 106, 108.

The server services 138 are basic building blocks for the rest of the functionality implemented on the application server. These services are protocol neutral, reusable and shared by the other layers of the stack. It should be noted that the set of services illustrated is not intended to be limiting or exhaustive and is being provided purely for purposes of illustration.

In one embodiment, a storage service 142 defines an abstraction for all state management in all stack layers. The performance and querying, as well as the atomicity, consistency, isolation and durability (ACID) properties are configured behind this general abstraction. In one embodiment, the storage service represents a partitioned in-memory database.

The configuration management service 144 can be used to manage all configuration data for the application server. In one embodiment, the configuration information can be persisted or backed by a set of extensible markup language (XML) files in a centralized file server (FS) location. The configuration data can be made available throughout the cluster to all components for read-only access. In one embodiment, only the administrator user has write access to the configuration. In addition to XML, configuration can have Java Management Extensions (JMX) interfaces. For example, there can exist a one-to-one mapping between XML defined by an XML schema definition (XSD) and an MBean representation of that data. One way to achieve this is by turning MBeans into annotated JAXB (Java Architecture for XML Binding) classes, which are then used to generate the XSD and parse XML representation. In one embodiment, a single server can be designated as the administration server and this server can be responsible for marshalling and unmarshalling configuration from memory to XML. In that case, the same server would allow modifications via JMX or through XML directly by running a watchdog thread on the configuration files. Cluster-wide access could be achieved using a cache-aside strategy with a replicated cluster cache. The components which are interested in configuration changes can then register for update notifications.

The statistics service 146 can be a basic service of keeping track of system usage for historical records, audit trail and capacity planning purposes. In one embodiment, the statistics service can expose a set of reporting functionality.

The Alarm/CDR/EDR service 140 can be used for aggregating, collecting and filtering events used to track of specific application behavior and usage. This service can generalize events produced as part of application execution used for the purposes of charging or alarm notifications. Events can be used to collect detailed information about application specific usage. This service can also serve as an integration point to external systems.

The deployment service 148 can serve as a cluster-wide deployment solution for the application server. In one embodiment, a designated deployment server can be chosen to host a deployment web application. The application can be comprised of a deployment servlet that serves bundles of the file server. In one embodiment, only the server designated for deployment would keep a single copy of the latest code on the FS. All other servers can be configured to point to the URL of the deployment servlet and always download the latest code on restart. Download of the latest code could also be triggered from the deployment server through the use of cluster communication APIs. This does not presume two phase updates, but all servers performing the deployment should acknowledge on success to have an indication of current status.

In various alternative embodiments, additional server services 150 can be implemented, as needed to address the needs of an application developer. For example, a clustering service can be used to maintain cluster membership/replication, an SLA management service can keep track of service level agreement (SLA) enforcement and the like.

Additionally, the application server can include call, session and state management mechanisms, including, but not limited to, call control 110, media session control 112, messaging 114, the call model 116, session initiation protocol (SIP) finite state machine (FSM) 118, intelligent network application part (INAP) FSM 120, real-time streaming protocol (RTSP) FSM 122 and short messaging peer-to-peer protocol (SMPP) session control 124.

Basic Toolkit Programming Layer

Figure 2:
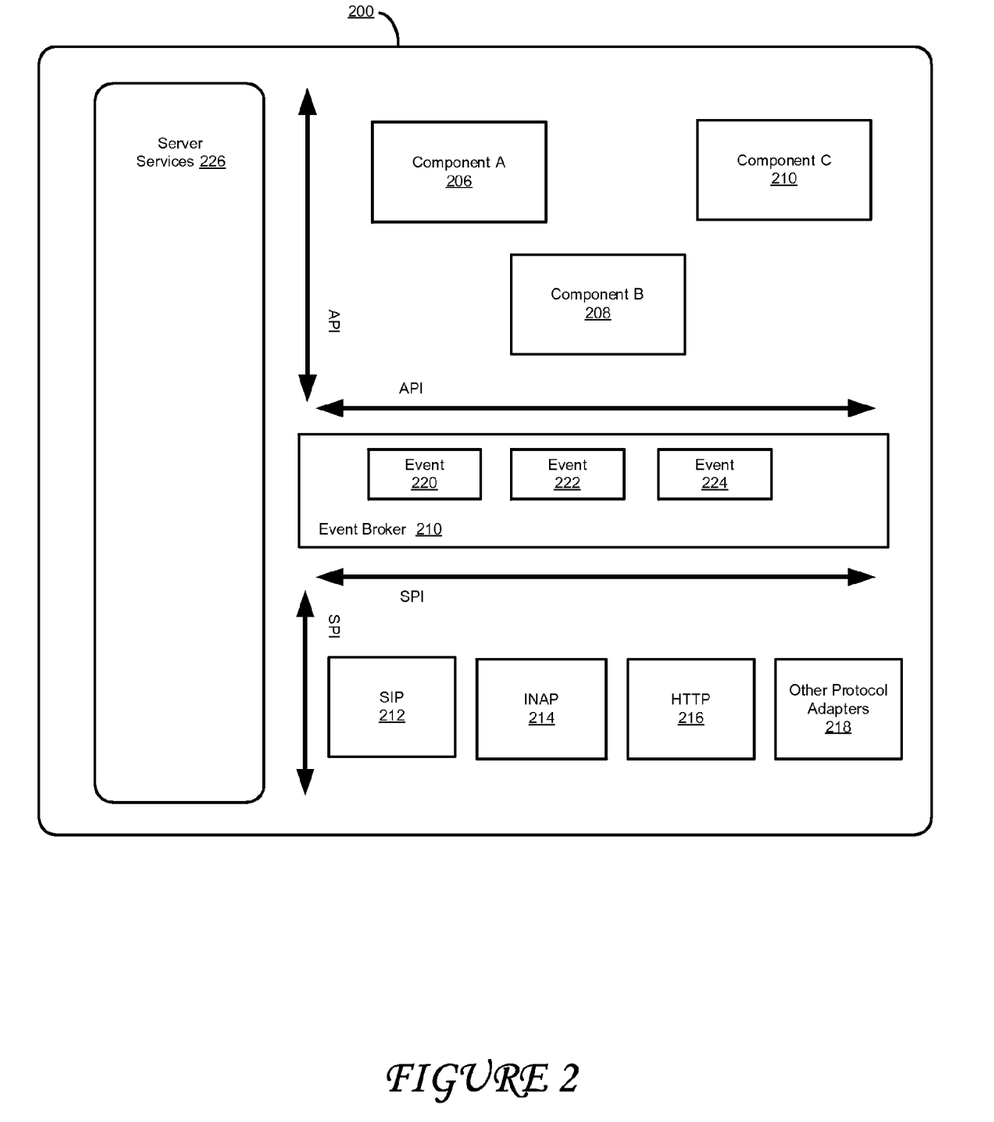
FIG. 2 is an illustration of the basic toolkit layer of the programming model employed by the application server, in accordance with various embodiments of the invention.

FIG. 2 is an illustration of the basic toolkit layer of the programming model employed by the application server, in accordance with various embodiments of the invention.

Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the basic toolkit provides a programming model where protocol-specific communications are abstracted to asynchronous events. The protocol abstraction layer can be implemented as an event broker 210 that is positioned between the various application components 206, 208, 210 and protocol adapters 212, 214, 216, 218, that expose a specific protocol. In one embodiment, the event broker exposes a set of application programming interfaces (APIs) that represent a uniform event-based abstraction of all protocols used in the application server. This set of event-based APIs can be used for registration and propagation by event consumers and producers.

All of the work as seen by application components running on the application server can thus be modeled as an event 220, 222, 224. Events trigger invocation and interaction of application components 206, 208, 210. State transitions can also trigger events and are implemented as updates to the application state in some form of a database. Consumers interested in state changes register with the event broker for a specific state instance that they wish to receive update events on.

The event model is the basis for asynchronous execution environment in the application server. In one embodiment, each event is processed serially by a set of its consumers. External protocol messages serve as the initiating events asynchronous with respect to the protocol sockets. Asynchronous behavior is triggered by new events produced as part of processing an event that preceded them. In this way, an event is the unit of asynchrony.

The application server 200 is intended for direct consumption of multiple protocols in the same process. This functionality utilizes a model that allows combination of protocols with vastly different semantics and at different stack layers from the web, legacy telecom, and next generation telecom domains. Mapping protocol messages onto events allows efficient protocol abstraction and decoupling of interactions between different protocols. Higher order protocols could abstract away the details of the lower order protocols to some outside observers/clients. A simple example is a monolithic TPC operation via HTTP request that decomposes into a series of fine grained SIP request/response messages. Breaking inbound and outbound messages into events decouples them and allows multiple consumers to react while satisfying a set of features.

In various embodiments, events 220, 222, 224 delivered through the event broker represent the lowest level of abstraction of a network protocol, such as session initiation protocol (SIP), intelligent network application part (INAP) of the SS7 protocol or hypertext transfer protocol (HTTP). At the lowest level all the on-the-wire primitives are exposed and made available for processing or manipulation to the application components 206, 208, 210. Multiple sand-boxing layers could decorate each individual event simplifying lower level details. These API layers could provide multiple levels of abstraction with respect to application component development. Certain sequences of events could be filtered by similar sand-boxing layers to encapsulate multiple event interactions as a single higher-order event type.

In one embodiment, the event model accommodates four event types: (1) inbound protocol events; (2) outbound protocol events; (3) outbound protocol event error notifications; and (4) state transition events. All the protocol specific messages processed by the protocol adapters are abstracted as protocol events. Protocol events are subdivided into inbound ones to represent messages being received and outbound ones for messages being sent out. Third protocol event type includes notification of application components of failure conditions in sending some protocol specific message from an adapter. Application state changes that have registered consumers define another event type.

Additionally, there can be several event consumer and producer types. Application components 206, 208, 210 can serve as consumers of inbound protocol events and producers of outbound protocol events. Protocol adapters 212, 214, 216, 218 can serve as consumers of outbound protocol events and producers of inbound protocol events. In one embodiment, because the communication within the application server is asynchronous, protocol adapters produce events back to the application components signifying failures in processing of outbound events. The storage service previously described can be a producer of state transition events. These events can indicate any create, read, update and delete (CRUD) type manipulations to instances of state in the storage service. Application components can register for state transition events through the same event broker API 210. In one embodiment, state transition events are the only mechanism for application components to signal to each other. These types of events are transactional with respect to the original state manipulation that has triggered the event. Based on the behavior described above, the event broker 210 can segment its APIs towards specialized consumer and producer types. It can also restrict the types of events that application components and protocol adapters could produce or consume.

In one embodiment, the event defined by the event broker 210 is a protocol-neutral shared contract between consumers and producers. Protocol event types can assume adapter interaction and have a shared notion of structure with addressing, payload, and other details. State transition events can include details of the modifying operation, state value before and after the transition, timestamp, etc. Each adapter would have a set of events that it is capable of producing or consuming with their own unique structure. In certain embodiments, all events have an associated event scoped context that allows consumers to propagate additional data not present at the time of event creation. In one embodiment, all events are immutable and cannot be changed after issuance.

In various embodiments, an event matching API is exposed by the event broker 210. This event matching API allows consumers to register for events based on multiple classifications. Event matching API can define expressions on the event content as defined by the event producer. These expressions should be flexible enough to allow union and intersection evaluations on classes of events. For example, the matching API could dynamically evaluate that a consumer should be invoked for all protocol events destined to a particular address, originating from a particular protocol, or having a particular area code in the originating address. In one embodiment, state transition events are restricted to static evaluations only. The event broker adapts state change registrations towards the storage service. The storage service state update notifications can then be proxied back through the event broker to find the right consumers. To avoid fan out of all state change notifications the event matching API can pre-evaluates the possible state transition consumers at the time of registration. In addition, certain crosscutting concerns, such as generation of charging records, statistics collection, license enforcement and the like can be implemented as regular consumers registered for some set of events.

In the various embodiments, the event model is also tied with the threading and scheduling of execution in the application server. In one embodiment, each event is processed asynchronously with respect to its producer. For example, a thread from a work manager pool (thread pool) can be allocated to an event for the duration of its lifetime. In this manner, the event broker can be a scheduler for all of the application environment code. In one embodiment, application components never start their own threads or schedule work explicitly. Additional asynchronous work is scheduled implicitly through creation of outbound protocol events and state transition events. The cooperation in scheduling between adapters and application components can follow a basic "Half-sync/Half-async" pattern for efficient asynchronous input/output (I/O).

Events can be prioritized with respect to each other by being assigned to different work managers based on the same event matching mechanism described above. Groups of events could be defined through event matching expressions that would then be mapped to particular work managers. In one embodiment, each adapter chooses a concurrency strategy appropriate to its protocol. The contract exposed by the adapter container can be that of a dispatcher that could have multiple concurrency strategies configured for each event through the adapter. In one embodiment, two possible strategies are: (1) thread per event; and (2) thread per protocol specific session. In cases of session based scheduling, events that belong to the same session (as defined by the protocol adapter) can be queued up against that session for serial execution.

In certain embodiments, event races and events-out-of-sequence are possible when multiple events which are logically sequential are produced very close to each other in time. The simplification with the defined event types can be to decompose multiple state transition events into an explicit chain that only produces the next event when the logically earlier one has been consumed. The transactionality of state changes would guarantee that a state transition event is only produced when the state changes associated with the earlier event have been committed. Follow up events would thus be side effects of the events that preceded them.

In various embodiments, state manipulation from the application components is done through synchronous invocations on the storage service. State manipulations can be transactional. Each event can be equated to a single transaction. In each transaction, storage service can be the single participating resource. These are very fine grained transactions, as are the events with each representing a single unit of work. Each event can model very precise, individual steps in larger processing of some feature. The event broker shared between all adapters can define the transaction and event boundaries. In one embodiment, application components do not communicate directly to other application components by propagating new events. Instead, the only way for application components to indicate that a given occurrence is something other components should be interested would be through state changes. Other components could then register for event notifications on specific state instances. As for all event types, state transition events can be propagated asynchronously with respect to the state modification that originated it. Decomposing larger processes into fine grained events and transactions would mean that the process could terminate in various intermediary states. Each process can then be designed in such a way as to insure that the intermediary states are still consistent with respect to the overall state machine.

In various embodiments, telecom-based features are constructed from a collection of application components. The term "features" refers to functionality similar to call waiting, caller ID, call forwarding, call screening, voicemail, and the like. With respect to the event broker, features are just event consumers and producers. Protocol and state transition events are composed into features through event broker registration and interaction model. Individual features can also cause the propagation of new events towards the telecom network or internally to transition feature components to some new state. Features can interact in order to be integrated into a complete service to the end subscriber. Flexible event matching rules allow multiple features to simply observe the same events or cooperate on handling of that event. The event broker flexible consumer registration and handling scheme allows multiple consumers to cooperate or override the handling of a single event.

Precedence rules of how a particular event is handled can be made explicit through the consumer registration API. Event matching functionality can be used for grouping and provisioning with respect to some complete service delivered to the subscriber. For example, features could register as consumers for specific protocol or application session by matching the event payload. Sets of subscribers could then be targeted by matching on specific origination or destination address.

CSP Adaptation Programming Layer

Figure 3:
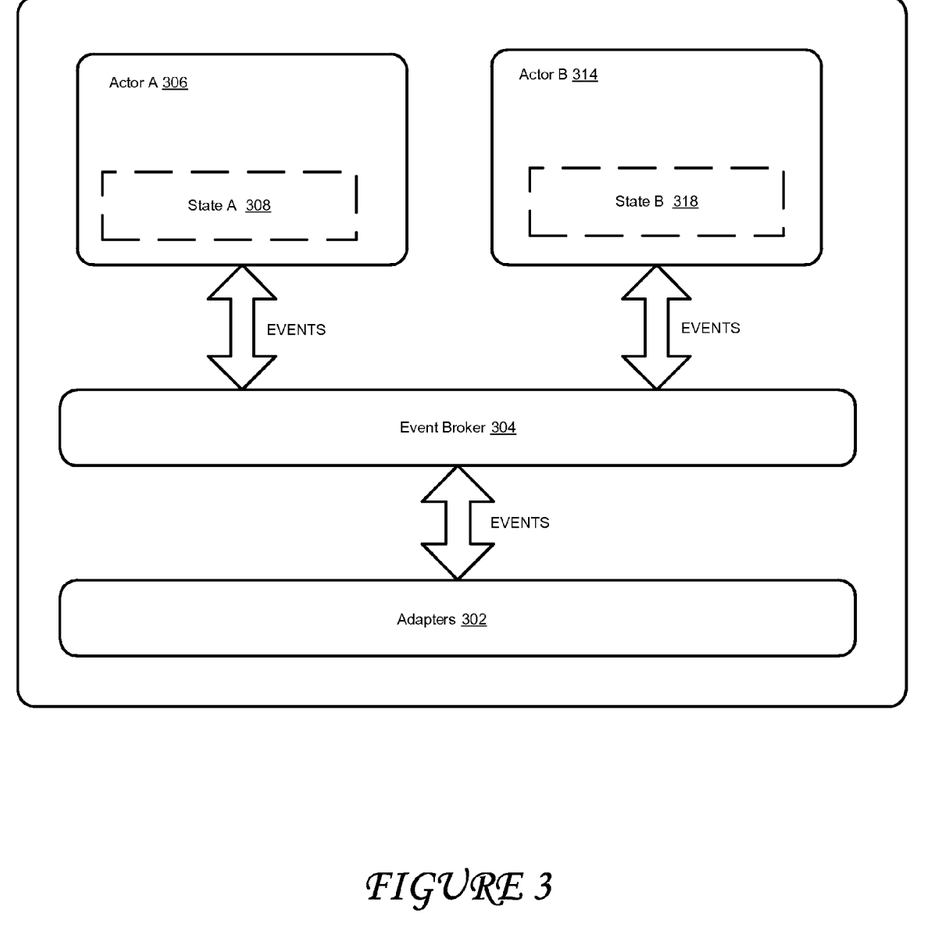
FIG. 3 is an illustration of the CSP Adaptation layer of the programming model employed by the application server, in accordance with various embodiments of the invention.

FIG. 3 is an illustration of the CSP Adaptation layer of the programming model employed by the application server, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the CSP Adaptation layer utilizes an actor-based model where the different actors 306, 314 communicate with each other by using asynchronous events issued via the event broker 304. In one embodiment, the "actor" is an entity that represents one or more application components. It can be implemented as a class, or some other unit of compilation that can be instantiated. Each actor instance is the owner of its own segment of state. Thus, for example, actor A 306 is the sole and exclusive owner of state segment A 308, while actor B 314 is the sole and exclusive owner of state segment B 318. If actor B wishes to update state segment A, it can send an asynchronous event to actor A, which can in turn react to the event by updating the state. This type of implementation obviates the need for any explicit global locks on the state in the application server. In one embodiment, each actor is a single thread with respect to the events it processes. Actors can service logically different, buffered event channels or queues. The asynchronous composition of actors can also rely on making communication with the outside world (protocol adapters 302) completely asynchronous. These asynchronous protocol APIs are exposed as protocol events of the event broker 304. Thus, in one embodiment, state transition events are the only API or protocol between the actors themselves. In this embodiment, actors 306, 314 have no public methods or variables that could accessed in the context of other code or actor.

In various embodiments, actors 306, 314 can be distributed across the cluster. The distribution of application components modeled as actors can be made completely transparent. This goal drives the following design decisions: actor is a very coarse grained object in terms of state that it owns. An actor can possibly contain the state of multiple call legs and the overall call itself in the case of call control. Actors are exclusive owners of encapsulated state with a unique identity in a multi-node cluster. In one embodiment, it is assumed that a partitioned, in-memory database forms the basis of all state management. In such a database, partitions would achieve reliability through maintaining primary and n backup copies of the managed state. A single owning actor instance is located next to (in the same process) the primary copy of its state. Since only the state managed by the in-memory database is considered or known of, actors themselves are stateless (or contain only volatile state).

Actor instantiation can be closely tied to the primary partition serving the actor-owned state at any given time. In one embodiment, once an actor is created, all the subsequent state that it creates and manipulates is allocated to the primary partition of the same process. Since the actor is stateless, the state could easily be migrated or failed-over to another process together with the data partition. When the primary partition is relocated for re-balancing or when the primary fails, all the related actors can be re-instantiated in the newly selected process. While the actor has no state, or at least only volatile state, it could still have a well known lifecycle. The last state of that lifecycle can be stored together with other owned state in the primary partition and could be used to replay the actor through a set of callbacks in case of fail-over. In a clean slate system, if there are no existing parent actors, new actors can be instantiated by having absolutely stateless primordial actors that are uniformly distributed throughout the cluster and listen for a broad categories of events. In such a setup, primordial actors are a catchall for events that don't have an explicit owner.

With global cluster identity, an actor may need to be located for which given events are intended. State transition registrations are naturally remotable and make the distributed actor-to-actor communication transparent. This may create an additional expense of having these registrations be fault tolerant. For protocol events, actors are located through the actor registry. This can be an internal component completely hidden by the event broker. It can have a dual function of mapping event registrations to actors and storing actor descriptors. These descriptors can contain information of how to obtain the Actor locally together with the current lifecycle state.

In one embodiment, class definitions of actors are uniformly deployed and are expected to be available at any process in a cluster. In this embodiment, only the event state is then serialized and passed to the distributed actor.

In various embodiments, actors are the units of collocation, transactions and concurrency, as well as possibly units of failure. As previously described, state management is performed via a partitioned, in-memory database. It is in the context of such database that the terms Collocation, Transaction and Concurrency are defined. In one embodiment, actor abstraction is useful if it is always collocated with the primary partition where all of the state it owns is being served. In these embodiments, all state belonging to an Actor therefore must and is guaranteed to be collocated even if it is spread between multiple data types and structures. This can be done through a customized partitioning scheme where data belonging to the same actor is assigned to the same partition, which implies the same physical machine. The hashing function for choosing the partition of newly allocated state reflects these actor based loci. Actor class type defines a way in which data structures that it stores in the storage service are all tied back to the storing actor instance. Achieving a balanced distribution of data between all partitions can be based on the following two assumptions: class definitions for all actors are uniformly deployed and are available on all nodes in a cluster. All types of network traffic can be uniformly load-balanced between all the nodes in the cluster. The second assumption has some obvious desirable qualities with regard to high availability. A possible optimization would be to choose the partition on the same node where the original network event arrives and the actor is instantiated.

In the context of transactions, actors can correspond to transactional units. A single transaction can be defined as all interactions with the in-memory database resource or its storage service abstraction as part of handling a single event by an actor. In various embodiments, this implies that transactions are always local and two-phase commit is not required. Since all state is locally available, only local locks are held as part of the transaction. In one embodiment, remote communication is still required to synchronize a primary partition with its backups, but locking is simplified if all operations are directed at the primary with potential synchronous call-throughs to the backups. If all operations are funneled through the primary, recovery and coordination would merely involve local operations on the primary. No complex distributed coordination between multiple partitions would be required. The validity of the primary-backup protocol here is based on a separate cluster election strategy that ensures a consistent view of the current primary for some partition.

In the context of concurrency, the single-threaded nature of actors can ensure simple, lock-free execution within a single process. In one embodiment, cluster-wide primary election ensures a globally unique actor identity to which all relevant events are directed.

In the context of state management, actors do not need to issue explicit global locks on the state they access, since they are sole owners of that state. Actor state is made durable by maintaining backup copies of it in the cluster. While actor model fits nicely onto state that could be categorized as being part of a particular application session, there are many other types of state that an application must frequently manage. In various embodiments, the following are four types of state and their corresponding mapping onto the actor model:

a. Read-mostly Configuration—In one embodiment, this data is never updated by the regular actors directly. Instead, actors are notified of its changes through the standard event mechanisms. Actors interested in particular portions of configuration can register for the corresponding notifications. This type of data can be thought of as being owned by the single actor that is the administrator of the system. Only the administrator would then have access to writing the configuration data through the standard management interfaces exposed.

b. Application Session State—Application state data that belongs to a particular session. A full application's state thus equates to one or more actors.

c. Application Shared Session State—This state does not belong to any specific application session but is shared between several cooperating sessions. This in-between category becomes a shared actor that receives or produces state change notifications to communicate with other session-specific actors.

d. Logging State—This state is accumulated as part of actor execution. It includes statistics and charging records that need to be made durable and transactional. This logging state can be thought of as belonging to the initiating actor. It can be attributed to the enclosing actor transaction and assigned to the same primary-backup groups that the owning actor belongs to. In one embodiment, logging state is never read from the actor environment and can be paged out after having been persisted.

While all state that a given actor owns may be guaranteed to be collocated on the same machine, this may not always be true for a set of related actors. In one embodiment, the locality and availability of state is preferred when modeling an application as a set of actors. For simpler applications, all state could and should be encapsulated by a single actor as much as possible. For applications that require multiple interacting actors, collocation can still be desirable and possible. The model attempts "best effort" collocation for interrelated instances of actors joined together by links. A straightforward way for these links to be established is programmatically through the base actor API at the time when new actor instances are created. Best effort collocation can still allow the linked actors to be remote when needed for balancing reasons, but it optimizes for the frequent case of small enough loci of actors. One call control example is a Conference Actor interacting with many Call Actors. Quite frequently it is expected that conferences would only have a few participant calls and therefore all actor instances could be collocated as the links between them are traced. For the less frequent conferences with many participants, the Call Actors could be balanced throughout the partitions in the cluster.

In various embodiments, it can be desirable to make events desirable in certain situations. In one embodiment, there are two points when an event could be made reliable. First, when the event arrives, after having been read of the socket and completely assembled. Second, before the event is sent out to a distributed actor. The first point is considered an acceptable loss of in-flight events in case of process failure. It is up to the upstream node, as defined by the protocol, to retransmit any unacknowledged messages. There is some value in providing reliability at the second point, as this can be a vulnerability introduced by the clustered design. Distributed event communication could be modeled as a distributed queue with store and forward behavior. The store portion of that behavior could be made less reliable, but also less latent by replication. Such a queue would be completely hidden by the event broker.

Figure 4:
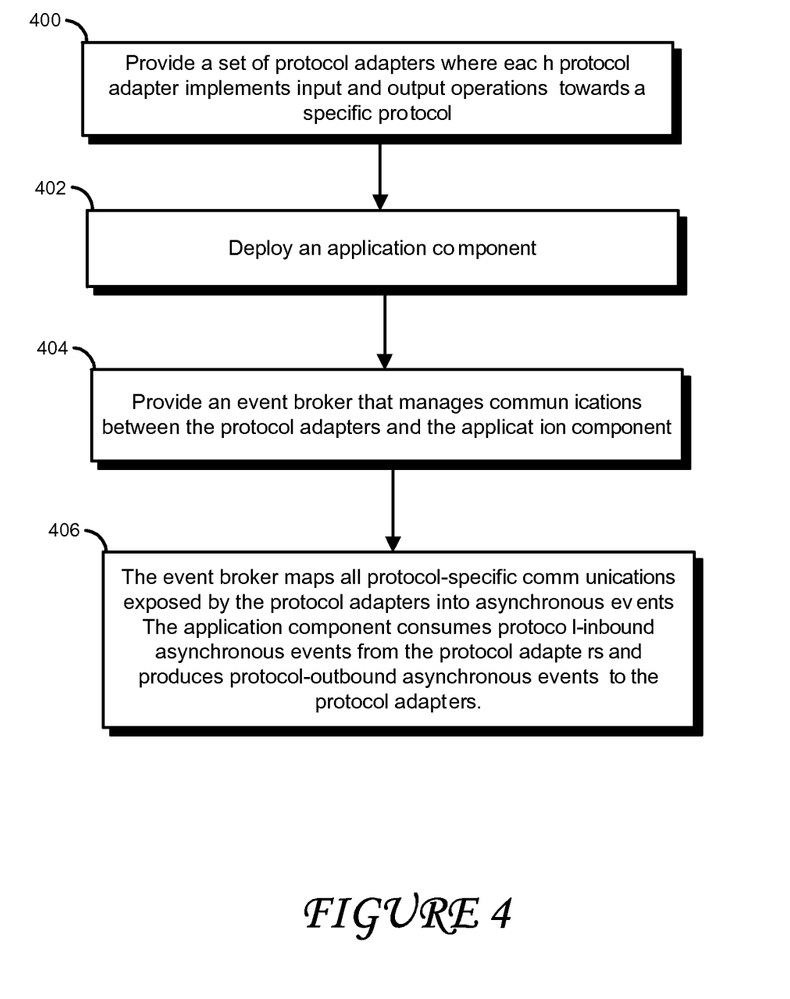
FIG. 4 is a flow chart diagram of a process for providing a protocol-neutral application server for developing telecommunications-based applications, in accordance with various embodiments of the invention.

FIG. 4 is a flow chart diagram of a process for providing a protocol-neutral application server for developing telecommunications-based applications, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

In step 400, a set of protocol adapters is provided on the application server. Each protocol adapter implements input and output operations towards a specific protocol, such as SIP or HTTP. In step 402, an application component is deployed on the server. The application component can be a portion of any software application, preferably one that implements telecom-based functionality. In step 404, an event broker is provided for managing communications between the protocol adapters and the application component(s). This event broker can map all protocol-specific communications exposed by the protocol adapters into asynchronous events, as shown in step 406. The application components consume protocol-inbound asynchronous events from the protocol adapters which they receive via the event broker. Moreover, the application components also produce protocol-outbound asynchronous events to the protocol adapters by invoking the event broker APIs. On the other side of communication, the protocol adapters can also function as producers and consumers of events.

As previously described, each of the protocol adapters can publish its API with respect to the protocol-specific events it is capable of producing and consuming. This API reflects several layers of abstraction that are defined by the adapter. At the lowest layer, all the protocol primitives are available to the application components. For inbound protocol events the adapter can be responsible for buffering and assembling a complete message and delivering it to the event broker as an event. The application components are free to react to that event in any way they prefer. Errors during the assembly of inbound events are the responsibility of the sender and the adapter. In one embodiment, the application is never aware of these types of errors. In one embodiment, outbound protocol events always originate from the application components and are asynchronously handed off to the adapter through the event broker. From that point, the adapter is responsible for the delivery of the derived message to the end recipient. In the case of unsuccessful delivery, the application can be notified by a special type of protocol error event.

The relevant protocol adapters can handle and hide transport and transmission related errors. In one embodiment, specific types of protocol error events can exist to allow the adapter to notify the application components of particular protocol level errors. These types of events can be different from other protocol events in that the application components are not expected to respond with some result to the adapter. While regular inbound protocol events might imply that a corresponding outbound event should be produced, protocol error events can simply notify the application to clean up any resources it dedicated to some conversation. For example, protocol error events can be used to indicate failed retransmissions over unreliable transport from the adapter to the application components. While the majority of protocol errors are dealt with at the adapter level, the application components can still be notified of their occurrence via events to allow the application to perform appropriate clean up and/or to transition to the next logical state. In one embodiment, application components are not expected to perform any protocol specific recovery from these errors. In one embodiment, application level errors are always handed directly to the application components to deal with as appropriate.

For protocols composed of layers with independent processing stages at each layer, the protocol adapters maintain the layering and the correlation of relationships between the layers. In one embodiment, layering is not the responsibility of the application components, but the details of the various layers are available to the application components through a particular event's payload. Protocol layers often create protocol specific conversation boundaries by relying on correlation identifiers to define the scope of the conversation at each layer. The event's conversational scope, as well as the actual correlation identifiers, can be made available to the application components. Such conversational scope can be preserved in any follow-on outbound events that the application components decide to produce through special factories and constructors exposed by the adapter. These special factories and event constructors are part of the API that adapters publish to the application components.

The main function of the adapter container can be to support a contract in which it cooperates with the protocol adapters in providing network connectivity to the application components. A pluggable SPI can be exposed, where new protocol adapters could be built outside the base product lifecycle. The adapter container and the protocol adapters can cooperate on the security and upgrade features of the application server. Upgrade includes application component upgrade as well as adapter upgrade, which proceed independently. In addition, the adapter container can perform housekeeping functions of deployment and lifecycle management with respect to the adapters. The container can ensure that all incoming events are properly authenticated and authorized. It can also provide appropriate credential mapping for events outgoing towards external network entities. In one embodiment, the container manages the security aspects of application and subscriber identities. During upgrades, the container owns the coordination between different versions of protocol adapters as they hand-off work to each other. The versioning information of different application components can be passed through to the adapters to allow them to handle the transition of traffic.

In various embodiments, the application components can see two different abstractions depending on which layer of the programming model is being employed. Application components which are based on basic toolkit alone can communicate by pure method calls. In terms of concurrency and atomicity, these types of components may expect a higher level lock and scope isolation in order to protect access to any shared state. In contrast, application components leveraging the actor-model could take advantage of more restrictive isolation. In one embodiment, actors only communicate through state transition events and have no public methods. Actors themselves could encapsulate other lower level components that are not thread safe. Each actor exposes an API that allows tying entries stored in multiple storage service stores to the same cluster location, transaction, and unit of concurrency. Lower level application components could be more flexible if they expect store instances via constructors. Actors or other higher level components could then serve as store factories customizing state management and concurrency strategy.

In various embodiments, the composition of application components can focus on attaching behavior and relevant state to an application-specific actor. Most types of applications deployed in the application server will likely have an associated session that has some duration and keeps state needed to conduct conversations relevant to that application. Application sessions may correspond to one or more actors. Such actors would compose interaction with several diverse endpoints by combining protocol-specific components. State required for keeping the protocol-specific conversations is then combined with the application session within the enclosing actor. The state management needs of the lower level components can be abstracted away such that they could be reused in multiple applications. One example is composing video and messaging functionality in a video conferencing application. Application session could contain details of the number of participants and their status. Separate reusable components would correspond to media stream leg and messaging capability. For both media stream and messaging components, state is kept to conduct protocol specific conversations. Both components rely on the enclosing actor to manage their state and expect a simple Java map based interface to be passed in at the time of construction. The video conferencing actor would tie together the application session with media stream and messaging components.

Further composition is also possible at the actor level. State transition notifications could be shared between different actors. An example is expressing multiple features as actors registered for events on a single basic call FSM actor.

As described above, the use of the programming model, including the basic toolkit and the CSP adaptation layers, enables the abstraction and neutrality of the various protocols that applications may need to access. No preference is given to any particular protocol within the structure of the application itself. As such, the resulting products and features can provide for easier adoption of new standards and protocols, as well as generally less conflicting paradigms for integration with different technology mediums.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. In various embodiments, the transmission may include a plurality of separate transmissions.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for providing a protocol-neutral application server for developing telecommunications-based applications, said system comprising:
   an event broker operating on one or more microprocessors and memory;
   a set of protocol adapters, each protocol adapter implementing input and output operations towards a specific protocol and producing protocol-inbound asynchronous events to the event broker and consuming protocol-outbound asynchronous events from the event broker;
   wherein the event broker maps all protocol-specific communications exposed by said set of protocol adapters into asynchronous events;
   a plurality of application components wherein each application component consumes protocol-inbound asynchronous events from the event broker and produces protocol-outbound asynchronous events to the event broker, such that all communications between each application component and each of said set of protocol adapters are made through asynchronous events via the event broker and are decoupled from protocol-specific semantics;
   a plurality of actors, wherein each actor includes one or more of said application components, and wherein said plurality of actors is adapted to be instantiated as a plurality of actor instances;
   each of said plurality of actor instances being an exclusive owner of a segment of state assigned to the actor instance; and
   wherein a first actor instance of said plurality of actor instances may only communicate with a second actor instance of said plurality of actor instances by transmitting actor-to-actor asynchronous events to said event broker, which actor-to-actor asynchronous events are then received directly from said event broker by said second actor instance.

2. The system of claim 1, wherein each actor instance is collocated with a primary partition where said segment of state assigned to the actor instance is being served.

3. The system of claim 2, wherein the segment of state is at least one of the following:
   read-mostly configuration data owned by an administrator actor, wherein one or more other actors register for notifications of changes to the configuration data;
   application state data that is associated with a particular session;
   application shared-session state data that is associated with two or more cooperating sessions; and
   logging state data that include statistics and charging records accumulated as part of actor execution.

4. The system of claim 2, wherein the actors of said plurality of actors are one of, stateless, and containing only volatile state.

5. The system of claim 1, wherein each actor is a single thread of execution, such that the actor never issues an explicit global lock on the segment of state that the actor is accessing because the actor is the sole exclusive owner of said segment of state.

6. The system of claim 1, wherein said asynchronous events further include the following:
   outbound protocol event error notifications that notify the application component of failure conditions in sending a protocol-specific message from a protocol adapter; and
   state transition events that represent a change in application state that has registered consumers.

7. The system of claim 1, further comprising a set of protocol-neutral server services that includes each of the following:
   a storage service that provides a partitioned in-memory database for managing state;
   a clustering service that manages cluster membership tracking and replication;
   a statistics service that tracks system usage;
   a configuration management service that persists configuration data in a centralized file server location, wherein the configuration data is available for all components for read-only access; and
   a deployment service that manages deployment of application components.

8. The system of claim 1, further comprising a set of protocol-neutral server services that includes one or more of the following:
- a storage service that provides a partitioned in-memory database for managing state;
- a clustering service that manages cluster membership tracking and replication;
- a configuration management service that persists configuration data in a centralized file server location, wherein the configuration data is available for all components for read-only access;
- a deployment service that manages deployment of application components;
- a statistics service that tracks system usage; and
- an alarm service that aggregates, collects and filters events used to track specific application behavior.

9. The system of claim 1, wherein the event broker schedules a thread from a thread pool to process an event asynchronously with respect to the event's producer, such that said event broker serves as a scheduler for all application environment code.

10. The system of claim 1, further comprising:
- an adapter container that manages the set of protocol adapters, wherein the adapter container exposes a service provider interface (SPI) for constructing new protocol adapters outside of an application lifecycle.

11. A method of providing a protocol-neutral application server for developing telecommunications-based applications, said method comprising:
- providing a set of protocol adapters, each protocol adapter implementing input and output operations towards a specific protocol;
- providing a plurality of application components;
- providing an event broker operating on one or more microprocessor that manages communications between the set of protocol adapters and the plurality of application components;
- mapping, by the event broker, all protocol-specific communications exposed by the set of protocol adapters into asynchronous events;
- wherein the application components consume protocol-inbound asynchronous events received via the event broker from said set of protocol adapters and produce protocol-outbound asynchronous events transmitted via the event broker to said set of protocol adapters, such that all communications between the application components and said set of protocol adapters are made through asynchronous events via the event broker and are decoupled from protocol-specific semantics;
- providing a plurality of actors, wherein each actor includes one or more of said application components, and wherein said plurality of actors is adapted to be instantiated as a plurality of actor instances wherein each said actor instance is an exclusive owner of a segment of state assigned to the actor instance; and
- communicating between a first actor instance of said plurality of actor instances and a second actor instance of said plurality of actor instances only by transmitting and receiving actor-to-actor asynchronous events directly via said event broker.

12. The method of claim 11, wherein each actor instance is collocated with a primary partition where said segment of state assigned to the actor instance is being served.

13. The method of claim 12, wherein the segment of state is at least one of the following:
- read-mostly configuration data owned by an administrator actor, wherein one or more other actors register for notifications of changes to the configuration data;
- application state data that is associated with a particular session;
- application shared-session state data that is associated with two or more cooperating sessions; and
- logging state data that include statistics and charging records accumulated as part of actor execution.

14. The method of claim 12, wherein the actors of said plurality of actors are one of, stateless, and containing only volatile state.

15. The method of claim 11, wherein each actor is a single thread of execution, such that the actor never issues an explicit global lock on the segment of state that the actor is accessing because the actor is the sole exclusive owner of said segment of state.

16. The method of claim 11, wherein said asynchronous events further include one or more of the following:
- outbound protocol event error notifications that notify the application component of failure conditions in sending a protocol-specific message from a protocol adapter; and
- state transition events that represent a change in application state that has registered consumers.

17. The method of claim 11, further comprising providing a set of protocol-neutral server services that includes each of the following:
- a storage service that provides a partitioned in-memory database for managing state;
- a statistics service that tracks system usage;
- a clustering service that manages cluster membership tracking and replication;
- a configuration management service that persists configuration data in a centralized file server location, wherein the configuration data is available for all components for read-only access; and
- a deployment service that manages deployment of application components.

18. The method of claim 11, further comprising providing a set of protocol-neutral server services that includes one or more of the following:
- a storage service that provides a partitioned in-memory database for managing state;
- a clustering service that manages cluster membership tracking and replication;
- a configuration management service that persists configuration data in a centralized file server location, wherein the configuration data is available for all components for read-only access;
- a deployment service that manages deployment of application components;
- a statistics service that tracks system usage; and
- an alarm service that aggregates, collects and filters events used to track specific application behavior.

19. The method of claim 11, wherein the event broker schedules a thread from a thread pool to process an event asynchronously with respect to the event's producer, such that said event broker serves as a scheduler for all application environment code.

20. A non-transitory computer-readable storage medium carrying one or more sequences of instructions for providing a protocol-neutral application server, which instructions, when executed by one or more microprocessors, cause the one or more microprocessors to carry out the steps of:
- providing a set of protocol adapters, each protocol adapter implementing input and output operations towards a specific protocol;

providing a plurality of application components;

providing an event broker that manages communications between the set of protocol adapters and the application components;

mapping, by the event broker, all protocol-specific communications exposed by the set of protocol adapters into asynchronous events;

wherein the application components consume protocol-inbound asynchronous events received via the event broker from said set of protocol adapters and produce protocol-outbound asynchronous events transmitted via the event broker to said set of protocol adapters, such that all communications between the application components and said set of protocol adapters are made through asynchronous events via the event broker and are decoupled from protocol-specific semantics;

providing a plurality of actors, wherein each actor includes one or more of said application components, and wherein said plurality of actors is adapted to be instantiated as a plurality of actor instances wherein each actor instance is an exclusive owner of a segment of state assigned to the actor instance; and communicating between a first actor instance of said plurality of actor instances and a second actor instance of said plurality of actor instances only by transmitting and receiving actor-to-actor asynchronous events directly via said event broker.

* * * * *

UNITED STATES PATENT AND TRADEMARK OFFICE
CERTIFICATE OF CORRECTION

| | |
|---|---|
| PATENT NO. | : 8,719,780 B2 |
| APPLICATION NO. | : 13/171088 |
| DATED | : May 6, 2014 |
| INVENTOR(S) | : Selitser et al. |

Page 1 of 1

It is certified that error appears in the above-identified patent and that said Letters Patent is hereby corrected as shown below:

In the Drawings

On sheet 4 of 4, in figure 4, under Reference Numeral 400, line 1, delete "eac h" and insert -- each --, therefor.

On sheet 4 of 4, in figure 4, under Reference Numeral 402, line 1, delete "co mponent" and insert -- component --, therefor.

On sheet 4 of 4, in figure 4, under Reference Numeral 404, line 1, delete "comm unications" and insert -- communications --, therefor.

On sheet 4 of 4, in figure 4, under Reference Numeral 404, line 2, delete "applicat ion" and insert -- application --, therefor.

On sheet 4 of 4, in figure 4, under Reference Numeral 406, line 1, delete "comm unications" and insert -- communications --, therefor.

On sheet 4 of 4, in figure 4, under Reference Numeral 406, line 2, delete "ev ents" and insert -- events --, therefor.

On sheet 4 of 4, in figure 4, under Reference Numeral 406, line 3, delete "protoco l" and insert -- protocol --, therefor.

On sheet 4 of 4, in figure 4, under Reference Numeral 406, line 4, delete "adapte rs" and insert -- adapters --, therefor.

In the Specification

In column 3, line 27, delete "in tact." and insert -- intact. --, therefor.

Signed and Sealed this
Fourteenth Day of October, 2014

Michelle K. Lee
*Deputy Director of the United States Patent and Trademark Office*